United States Patent [19]

Barber

[11] Patent Number: 4,524,159

[45] Date of Patent: * Jun. 18, 1985

[54] LEAK STOPPING COMPOSITION AND METHOD

[75] Inventor: Alan G. Barber, Woodbury, Conn.

[73] Assignee: Union Carbide Corporation, Danbury, Conn.

[ * ] Notice: The portion of the term of this patent subsequent to Apr. 3, 2001 has been disclaimed.

[21] Appl. No.: 578,857

[22] Filed: Feb. 10, 1984

Related U.S. Application Data

[63] Continuation-in-part of Ser. No. 361,546, Mar. 24, 1982, Pat. No. 4,439,561.

[51] Int. Cl.³ ............................................... C09K 3/12
[52] U.S. Cl. .................................... 523/177; 523/130; 106/33; 252/8.5 LC; 252/72; 252/363.5
[58] Field of Search ................ 523/130, 177; 525/935; 106/33; 252/72, 363.5, 8.5 LC

[56] References Cited

U.S. PATENT DOCUMENTS 4,439,561  3/1984  Barber .................................. 524/52

*Primary Examiner*—John Kight
*Assistant Examiner*—Nathan M. Nutter
*Attorney, Agent, or Firm*—James L. Sonntag

[57] ABSTRACT

A leak stopping composition for use in heat exchange systems comprising a dispersion of a fibrillated fiber in a liquid medium.

38 Claims, No Drawings

LEAK STOPPING COMPOSITION AND METHOD

RELATED APPLICATIONS

This application is a continuation-in-part to copending application Ser. No. 361,546, titled "SEALANT COMPOSITION AND METHOD", filed Mar. 24, 1982, now U.S. Pat. No. 4,439,561 by Alan Gill Barber.

FIELD OF THE INVENTION

The present invention relates to a sealant composition for the sealing of leaks in a heat exchange system, such as automobile cooling systems and the like. Particularly, the invention relates to a heat exchange liquid composition comprising a suspension of a fibrillated fiber in a suitable liquid medium.

BACKGROUND OF THE INVENTION

So called "stop leak" compositions have long been used for stopping leaks in automobile cooling systems. Many of these compositions are aqueous suspensions of a particulate material that is entrained in the leak, thereby plugging it. Particulate materials that were used include linseed meal and metal flakes. However, these compositions are often not effective in completely stopping the leak, particularly under pressure, resulting in excessive loss of the coolant.

For many years stop leak compositions were improved by the addition of an asbestos fiber to the particulate material. However, the use of asbestos was not always effective and there are now known to be health and environmental problems associated with the use of asbestos.

It is also known to use asbestos fiber in an antifreeze composition to provide some leak stopping ability to the antifreeze.

In the above-cited Ser. No. 361,546 is disclosed a stop leak composition that is substantially more effective than the above-discussed prior art stopleak compositions in the stopping of leaks. Therein is disclosed a composition for the stopping of leaks in a leaky container, preferably a heat exchange system such as automobile cooling systems, which comprises a suspension in a liquid medium of a particulate material of a size and in an amount sufficient to become entrained in the leak, and fibrillated fiber coacting with the particulate material to seal the leak by an entwining action.

Typically stop leak compositions are supplied to the consumer in the form of a concentrate that is added to the fluid of the coolant system. In the case of a preferred stop leak of Ser. No. 361,546 above, a concentrate is formed comprising an aqueous suspension of a particulate material and a fibrillated fiber. This concentrate is then added by the consumer to the fluid of the cooling system, which is typically an antifreeze composition. The concentrate is then diluted by and dispersed throughout the cooling system to provide an effective amount of particulate material and fibrillated fiber to plug leaks in the cooling system.

An alternative method of supplying a stop leak to the consumer is to provide an antifreeze composition with leak stopping abilities. Thus, as the consumer periodically adds to or replaces the antifreeze in his automobile cooling system, a stop leak composition is added automatically. This method is generally not as desirable as the concentrate method above since the stop leak is applied universally, even to cooling systems without leaks. A consumer having a leak-free cooling system may not wish to have additional and unnecessary additives in the antifreeze used in his cooling system. Additionally it is uneconomical for the manufacturer to add a stop leak, when the antifreeze will primarily be used in systems that are free of leaks. Furthermore, providing an antifreeze to the consumer, which contains a stop leak, such as a stop leak of above-cited, Ser. No. 361,546, requires the addition of extra process steps and ingredients that add to the expense of manufacture but do not increase its effectiveness in most of the systems in which it used, since most cooling systems are leak-free. However, there are consumers, who, as a precautionary measure, wish to add a stop leak composition to their cooling system as they add antifreeze, even though their cooling system is free of leaks. In order to meet the need of these consumers, it would, therefore, be desirable to provide an antifreeze composition with a leak stopping ability in addition to providing the normal antifreeze not having leak stopping ability. However, considering the problems described above, such an antifreeze composition would have to be economical to manufacture and have a minimum amount of additional additives. Also the manufacture of such a stop leak antifreeze should be easily accomplished by a minimal alteration of existing manufacturing practices for making antifreeze. It would then be easy to quickly modify the manufacturing process to make either a stop leak containing or a stop leak free antifreeze.

It is, therefore, an object of the invention to provide an antifreeze composition with leak stopping ability.

It is also an object of the invention to provide an antifreeze composition with leak stopping ability without materially adding to the costs of making the antifreeze composition and with minimum of additional process steps in the manufacturing system.

It is further an object of the invention to provide an antifreeze composition with leak stopping ability that contains a minimum of additional additives.

SUMMARY OF THE INVENTION

In its broadest aspect, the present invention comprises a composition for the stopping of leaks in a coolant system which comprises a suspension in a liquid medium of a fibrillated fiber in an amount which is effective for the stopping of leaks.

Preferably the liquid medium is an antifreeze composition.

DESCRIPTION OF THE INVENTION

It is known in the art that a suspension of fibers, such as asbestos fibers, in a liquid medium is effective as a stop leak composition. However, it has been found that when the fibers used are fibrillated fibers, the suspension has an unexpectedly high leak stopping ability. The above-cited U.S. Pat. No. 4,439,561, discloses a suspension of fibrillated fiber and a particulate material which synergistically coact in a leak stopping composition. In light of the teaching of U.S. Pat. No. 4,439,561, the absence of a particulate material would provide no synergistic coaction, and it would be expected that a fibrillated fiber used alone would act similarly to other fibers. However, it has been found that suspensions containing fibrillated fibers and no particulate material have a leak stopping ability and show significant improvement over comparable suspensions using nonfibrillated fibers.

The composition of the invention is effective for the stopping of pinhole leaks and small crevice leaks. Although this is inferior to the stop leak of U.S. Pat. No. 4,439,561, since there is no synergistic action of a particulate material and a fibrillated fiber, it does provide improvement over known stop leaks using a non-fibrillated fiber as the sealant. Furthermore, the stop leak of the invention is cheaper to manufacture and is more easily incorporated as a component of an antifreeze composition than the composition of U.S. Pat. No. 4,439,561.

The manufacture of the stop leak of the invention is easily adaptable to existing manufacturing methods for making antifreeze. By using the preferred method of manufacture described below, a stop leak composition of the invention, comprising a suspension of a fibrillated fiber in an antifreeze composition, is made with a minimum of additional equipment costs and material handling. Such a stop leak antifreeze according to the invention can also be made with a minimum of additional additives. Only the fibrillated fiber and optionally a suspending agent and a small amount of added water are typically the sole additional materials in the antifreeze composition of this invention, and these are present in only very small amounts.

As used herein "fibrillated fiber" means fiber that is frayed or split along its length or a fiber wherein the ends are split and splayed out, resulting in a multitude of very fine fibrils upon a core fiber. The smaller and thinner fibers or fibrils formed on the core fiber by the fraying or splitting are known as fibrillae. The fibrillated fibers used in the invention can be formed from fibers that are axially oriented and are less strongly bonded in the transverse direction, such as wood, and certain synthetic fibers described below.

A commonly known fiber that can be fibrillated is wood fiber, which may be fibrillated by controlling the conditions under which the fiber is cut. The fibrillating of wood fiber is explained by Julino Grant in Laboratory Handbook of Pulp and Paper Manufacture, 2nd Edition, 1961, Great Britain, at pp. 147–152.

Fibrillated fibers made from synthetic materials are also contemplated for use in the invention. Examples of synthetic fibrillated fibers and methods for making them are disclosed in U.S. Pat. No. 3,097,991, issued to W. A. Miller, et al. on July 16, 1963, and U.S. Pat. No. 3,560,318, issued to W. A. Miller, et al. on Feb. 2, 1971. Processes for making synthetic fibrillated fibers typically involve the cutting and beating of a fiber of a film of an oriented polymer, in for example a paper beater.

Synthetic polymers can be formed into oriented films or fibers by methods known in the art. These typically involve the controlling of the extrusion process and/or a stretching process to orient the polymer in the film or fiber. The oriented fibers or films must be stronger in an axial direction and weaker in a transverse direction to an extent to allow fibrillation. Optionally the polymer can be coextruded with an incompatible polymer, as is described in the above cited patents, to more readily form a fiber or film that is strong in an axial direction and weak in a transverse direction. This can be accomplished be addition of the incompatible polymer to the polymer melt or the polymer solution or "dope" that is to be extruded. Certain polymers such as poly(imino-1,4-phenyleneiminoterephthaloyl), described below, may be formed in a highly oriented state with long, strong, axial, "grains" separated by weaker amorphous regions, and may not require the use of an incompatable polymer to form fibrillable fibers. The formation of fibrillated fiber from synthetic polymers is well known in the art.

The fibrillated fibers of the invention should be fibrillated to the extent to provide a surface area greater than about 1 square meter per gram, preferably greater than about 10 square meters per gram. The surface area is measured by the B-E-T method as described in Brunauer, et al. in J. Am. Chem. Soc., 60, 309 (1938).

To provide the leak sealing action of the invention, the length of the fiber should have an average length greater than about 1 millimeter. The fibrillated fiber should not be too long to interfere or hinder the fluid flow within the coolant system. For use in automobile coolant systems the length of the fibrillated fiber should be between about 1 millimeter and about 7 millimeters.

The fibrillated fibers should be of a substance that is stable. By "stable" is meant a sustance that doesn't significantly react or degrade in the environmental conditions which may occur in the coolant system in which the composition of the invention is used. For use in automobile cooling systems, this would be a substance that is thermally stable up to about 300° F. (150° C.), preferably up to about 500° F. (260° C.), and is unreactive with the components of the coolant, such as water, corrosion inhibitors, antifreeze compositions and other substances commonly found in automobile cooling systems.

Any polymer that can be made into a fibrillated fiber and is stable in the environment of use is a suitable substance for use in the invention. Suitable polymeric materials include polyamides and polysulfones.

The preferred fiber for use in the invention is a fibrillated fiber comprising a polymer consisting essentially of the recurring units selected from the group;

 (I)

 (II)

 (III)

with the proviso that

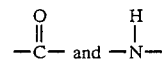

are present in the polymer in substantially equimolar amounts, and wherein R, R', and R", which may the same or different, are divalent radicals, n may be zero or the integer one, and wherein the R, R', and R" radicals in the polymer are saturated or unsaturated aliphatic or ringed aliphatic radicals containing 1 to 10 carbon atoms, or single ringed or fused multiringed carbocyclic, or heterocyclic aromatic radicals, or a series of such radicals. The R, R', or R" may contain substituents and other radicals that do not unduly interfere with the ability to form fibrillable fibers, for example through cross-linking, or cause the fiber to become too unstable or too chemically reactive for practice of the invention.

The preferred polymers of the class, described above, for use in the fibrillated fibers of the invention are those where the R, R', and R" in the polymer are single rigid radicals with extended bonds or a series of such rigid radicals which are linked together directly by extended bonds. Thus, the essential portion of the polymer consists of polyamide units (including polyoxamide units when n is zero), which provide stiff chains.

By the expression "rigid radicals" is meant (a) the ring radicals: single ring or fused multiring aromatic carbocyclic or heterocyclic radicals, trans-1,4-cyclohexylene

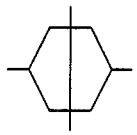

and (B) the linear unsaturated radicals: vinylene

and acetylene —C≡C—.

It will be understood that monomers containing amino groups directly attached to linear unsaturated radicals are not stable and hence vinylene or acetylene cannot serve as R' or that portion of a R" radical attached to

By the expression "extended bonds" is meant chain-extending bonds of the radical (as determined by the true bond angles) which are essentially coaxial or parallel and oppositely directed, such as in p-phenylene and 1,5-naphthylene.

A more preferred class of polymers of the group described above are those polyamides (n being the integer one) wherein at least 50 mole percent of the total of R, R', R" radicals are wholly aromatic. An even more preferred class of these polymers are those polyamides wherein R, and R' are selected from the group 1,4-phenylene, 4,4'-biphenylene, 2,6-naphthylene, 2,5-pyridine, trans-vinylene and trans-1,4-cyclohexylene and R" is 1,4-phenylene with the proviso that at least 50 mole percent of either R or R' radicals are 1,4-phenylene.

The most preferred fiber consists essentially of poly(imino-1,4-phenyleneiminoterephthaloyl) which is a polyamide polymer characterized by the repeating unit,

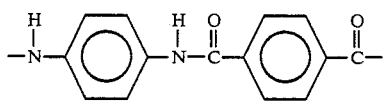

This polymer is available commercially under the trademarked name "KEVLAR" from E. I. DuPont de Nemours & Co., Center Road Building, Wilmington, Del., in a "pulp" form. This "pulp" consists essentially of short fibrillated fibers or fibers with a multitude of fibrillae or very fine fibrils upon a core fiber. Kevlar pulp is described by Merriman in "Kevlar Aramid Pulp for Paper Making", reprinted from 1981 TAPPI Non-Woven Fibers and Binders Seminar Notes, TAPPI, 1981. The preferred KEVLAR fibrillated fiber pulp used in the invention generally has a fiber length between about 1 mm and 4 mm, with an average length of about 2 mm. The method for forming fibrillated fibers of this polymer is not disclosed, but the fibrillated fibers of this polymer are probably formed in a manner similar to the methods discussed above, for forming fibrillated fibers from synthetic materials. The KEVLAR pulp, fibrillated fibers are most preferred in the composition of the invention because of the fibrillations, high thermal stability and inertness to chemical and biological action.

The preferred liquid medium is an antifreeze composition used in automobile coolant systems and the like. Antifreezes typically contain monohydric alcohols, and/or polyhydric alcohols as the principal components. These include methanol, ethanol, propanol, and the like; ethylene glycol, propylene glycol, diethylene glycol, glycerine, dipropylene glycol, 1,3-butylene glycol, polyethylene glycols, and polypropylene glycols. Preferably the antifreeze composition is principally ethylene glycol. Antifreezes also typically contain a minor amount of water and various additives, such as corrosion inhibitors. The antifreeze is typically used by adding it to a cooling system and diluting it with water to achieve the desired degree of antifreezing capability. Although an antifreeze composition is the preferred liquid medium, any liquid medium in which the fibrillated fiber can be dispersed, such as water, is contemplated for use in the invention.

The antifreeze may include additives commonly used in antifreeze compositions. These include, for example, known corrosion inhibitors used to protect surfaces of aluminum, iron, and other metals or materials that may be used as a material of constuction of the heat exchange system or other surface that may contact the liquid antifreeze medium. The corrosion inhibitors include silicone-stabilized silicone/silicate copolymer corrosion inhibitors, molybdates, alkanolamine salts of silicates, borates, phosphates, benzoates, hydroxyl benzoates or acids thereof, silicones, dispersible oils, alkali metal nitrates, tolyltriazole, alkali metal or alkanolamine salts of silicates, mercapotobenzothiazole and the like, or mixtures thereof. If one or more of the known inhibitors are employed, the sum total of all inhibitors should be used in an "inhibitory effective amount", i.e., and amount sufficient to provide some corrosion inhibition with respect to the surfaces to be protected. Corrosion inhibitors are described in U.S. Pat. Nos. 3,341,469 and 3,337,496.

Other typical optional additives would include wetting agents and surfactants such as, for example, known ionic and nonionic surfactants such as the poly(oxyalkene) adducts of fatty alcohols; antifoams and/or lubricants such as the well known polysiloxanes and the polyoxyalklene glycols, as well as any other minor ingredients known in the art that do not adversely affect the corrosion resistance sought to be achieved.

The preferred composition of the invention is a suspension of fibrillated fibers as the sole leak stopping additive. By "sole leak stopping additive" is meant that there are no other additives, such as particulate materials, that are added to lend leak stopping ability to the composition. The fibrillated fibers preferable consist essentially of poly(imino-1,4-phenyleneiminotereph-thaloyl), (KEVLAR) described above. The liquid medium is preferably an antifreeze composition comprising ethylene glycol and other common antifreeze additives, such as corrosion inhibitors. The antifreeze may also contain a minor amount of water introduced during processing, but it is preferred that the composition of the invention contain as little water as possible.

The amount of fibrillated fiber should be present in an amount effective for the stopping of leaks. Amounts greater than about 0.015 wt.% fibrillated fiber, based on the total weight of the leak stopping composition, have been found to be effective. Preferably the fibrillated fiber is present in an amount of about 0.03 wt.%, or greater based on the total weight. Amounts greater than about 0.03 wt.%, do not add significantly to the leak stopping ability of the composition, so compositions, having about 0.03 wt.% fibrillated fiber are more preferred. Unless otherwise indicated, values in weight percent (wt. %) are based on the total weight.

The composition of the invention is made by dispersing the fibrillated fiber in a liquid medium. To disperse the fibrillated fiber in water, a dispersant may be necessary. The dispersant may be any of the commonly known surfactants, which include quaternary ammonium compositions such as quaternary ammonium chloride.

Various alumino-silicate clay suspending agents can be used as dispersants. Suitable clays used as suspending agents and dispersants include various alumino-silicate clays that are known in the art for use as suspending agents, such as bentonite type clays. Suitable clays include Bentonite GPG-30, HPM-20, and Volclay KWK, manufactured by American Colloid Co., Skokie, Ill., and available from Whittaker, Clark & Daniels, Inc., 1000 Coolidge Street, South Plainfield, N.J. A preferred clay is a bentonite clay such as Volclay KWK.

The preferred composition of the invention, wherein as little water as possible is present, can be manufactured by the method disclosed and claimed in copending application Ser. No. 578,856, "Method For Dispersing Fibrillated Fibers", filed concurrently by A. G. Barber. The method comprises (i) providing a mixture consisting essentially of alcohol, preferably ethylene glycol, water, and dispersing agent, wherein the concentration of the water is at least about 15 wt.%, preferably between about 15 and 20 wt.%; (ii) dispersing a fibrillated fiber in the mixture of (i) to provide a fibrillated fiber predispersion; and (iii) diluting the predispersion of (ii) with alcohol, preferably an ethylene glycol based antifreeze, to provide a final dispersion of fibrillated fiber in an alcoholic medium. Preferably the dilution ratio is about 50 parts antifreeze to 1 part fibrillated fiber predispersion. Preferably the final dispersion contains less than 0.4 wt.% water added from the mixture in step (i) above. Preferably, the final dispersion contains a total water content from all sources of less than about 3.5 wt. %, preferably about 3 wt. % based on the total weight.

The predispersion mixture is preferably made by mixing a dispersing agent, such as a bentonite clay in water to form a uniform water/clay dispersion. Ethylene glycol is then mixed to form a thin glycol/water/clay mixture consisting essentially of about 2 weight percent of a bentonite clay in about 80 weight percent ethylene glycol, and about 18 weight percent water. To this is blended KEVLAR fibrillated fiber with a high speed propeller mixer in an amount of about 1.5 weight percent of the KEVLAR fibrillated fibers, based on the weight of the glycol/water/clay mixture. The predispersed mixture is then added to an ethylene glycol based antifreeze composition at a ratio to give a final dispersion having about 0.03 weight percent fibrillated fiber, based on the total weight. The antifreeze composition preferably contains corrosion inhibitors. It was found that it is difficult to disperse KEVLAR fibrillated fiber directly in ethylene glycol. Using a mixture with alcohol, the indicated amount of water, and a dispersing agent, it is possible to more easily disperse the fibrillated fiber without introducing a significant amount of water into the final antifreeze composition.

The following examples are only illustrative of the invention and are not intended to be limitative thereto.

EXAMPLE I

Compositions according to the invention, comprising a suspension of a fibrillated fiber in an antifreeze composition were made and tested. Comparative antifreeze compositions with no fiber added were also tested.

A bench test unit was used to measure the stop leak effectiveness of the compositions tested. The bench test unit was made to simulate pressure and temperature conditions typically found in an automobile cooling system. It comprised a vertical closed cylindrical reservoir $3\frac{7}{8}$ inches (9.8 cm) in diameter and $5\frac{1}{2}$ inches (14.0 cm) high fitted with a flanged leakage adaptor $1\frac{1}{2}$ inches (3.8 cm) from the reservoir bottom, and a pressure fitting above the fluid line in the reservoir. The pressure fitting was attached to a pressure regulated compressed air source such that any desired pressure in the reservoir could by achieved. The reservoir was also fitted with a thermoregulator (Fenwal-Thermoswitch, size No. 17100 115 V, Scientific Glass and Apparatus Co.); and a heater (Chromaloy R1-250 115 V, 250 W). Attached to the reservoir was an inlet and outlet for circulating liquid using an external pump. The inlet was a $\frac{3}{8}$ inch (1.0 cm) brass tube and was located about $1\frac{1}{2}$ inches (3.8 cm) from the reservoir bottom. This tube was curved at a 45 degree angle to divert the inlet stream from the leak opening and to give the liquid a clockwise swirling motion. Also provided were a pressure gauge and a bimetalic type thermometer. The fluid capacity of the entire system was about 0.9 liters. The leakage adaptor was $2\frac{3}{8}$ inches (6.0 cm) in diameter with a $\frac{3}{4}$ inch (1.9 cm) high base and had a $\frac{1}{2}$ inch (1.3 cm) deep threaded fitting for attachment to the reservoir. To the base was bolted a $2\frac{3}{8}$ inch (6.0 cm) diameter plate of nonmagnetic stainless steel in the 300 series which contained the desired hole or leak. For crevice leaks, the plate consisted of two abutting $\frac{1}{4}$ inch (0.6 cm) thick sections with a notch cut into one section to provide a crevice $\frac{1}{2}$ inch long (1.3 cm) and of the desired width. For pin-hole leaks, the plate consisted of a plate with a circular hole of the desired diameter. A catch pot was provided to catch the leaking fluid.

Before each test the test unit was cleaned by disassembly of the unit, mechanically removing any stop leak material and flushing the unit by pumping through it a rinse solution of water and detergent. The flushing is repeated until the unit is free of all stop leak material.

The tests were accomplished by adding to the test unit the stopleak composition of the invention and water in the amounts indicated below. The test unit was then closed, the pump was started, and the temperature of the fluid was raised to 190° F.±5° F. (88° C.±3° C.). The fluid flow rate was set at about 11,000 grams/minute. The unit was so operated with no pressure for 5 minutes after which the pressure was built up to 15 psig (103 kilopascals) over $2\frac{1}{2}$ minutes by incrementally increasing the pressure by $2\frac{1}{2}$ psig (17 kilopascals) every 30 seconds. The pressure was held at 15 psig (103 kilopascals) for 5½ minutes or until the leak sealed. The volume of the fluid lost during the test was noted.

The fiber used in this example was the KEVLAR fibrillated fiber described above. The fiber length was generally between about 1 mm and 4 mm with an average length of about 2 mm. The surface area was about 10 square meters per gram. The fiber was designated "Merge 6F218".

The samples of the invention were made by dispersing 10 parts Volclay KWK in 90 parts water containing 0.03 wt.% soda ash. This water/clay dispersion is then mixed into ethylene glycol to give 80 weight percent ethylene glycol, based on the total weight. To the above glycol/water/clay dispersion is added KEVLAR pulp fibrillated fiber to give a fibrillated fiber concentration of 1.5 wt.% KEVLAR, based on the total weight, to form a predispersion. The KEVLAR pulp fibrillated fiber is dispersed in the glycol/water/clay mixture by using a high speed mixer, such as a propeller type, and adding the fibrillated fiber gradually to the vortex. The stirring is continued until the predispersion is uniform. The predispersion is then mixed with an ethylene glycol based antifreeze (PRESTONE II (Trademark), manufactured by Union Carbide Corporation, Danbury, CT) in an amount to give the desired amount of fibrillated fiber in the antifreeze.

The antifreeze compositions of the invention and samples of the same antifreeze with no fiber were tested in the above-described test unit, by adding 300 ml of the antifreeze and 600 ml of water to the test unit. The leak was a pin-hole leak 0.013 inches (0.33 mm) in diameter. The results are summarized below in Table A.

TABLE A

| No. | Compositions of the Invention | |
|---|---|---|
| | Wt. % Fiber | Average Coolant Loss (ml) |
| 1 | 0.0015 | 200 |
| 2a | 0.005 | 200 |
| 2b | 0.005 | 200 |
| 3 | 0.015 | 188 |
| 4a | 0.03 | 20 |
| 4b | 0.03 | 20 |
| 4c | 0.03 | 7 |
| 4d | 0.03 | 5 |
| 4e | 0.03 | 47 |
| 4f | 0.03 | 14 |
| 5a | 0 | 180 |
| 5b | 0 | 210 |
| 5c | 0 | 150 |
| 5d | 0 | 150 |

The above results show that for a concentration above about 0.15 wt.% KEVLAR fibrillated fiber, there is a marked improvement in the ability to stop leaks. About 0.03 wt.% of the fibrillated fiber is needed for the best results. For pin-hole leaks of the size tested, a fluid loss in the area of 150 ml or greater is considered to show little or no leak-stopping ability, as demonstrated by samples 5a-5d containing no fiber.

EXAMPLE II

Comparative examples were run using a nonfibrillated fiber, asbestos fiber. The asbestos fiber was available from Johns Manville Corp., Englewood Cliffs, N.J., and coded 7T05. The comparative samples were made and tested as in Example I except the asbestos fiber was used instead of the KEVLAR fibrillated fiber. The results are summarized in Table B.

TABLE B

| No. | Asbestos Fiber | |
|---|---|---|
| | Wt. % Fiber | Coolant Loss (ml) |
| 6a | 0.03 | 132 |
| 6b | 0.03 | 150 |
| 6c | 0.03 | 100 |

By comparing these results with the results in Table A, showing compositions according to the invention (Nos. 4a-4f), there is demonstrated a significant improvement when the composition of the invention is used. Both the fibrillated and nonfibrillated fibers were used in equal concentrations, yet the average loss for the fibrillated fiber compositions was 19 ml, as compared to an average loss of 127 ml for the asbestos fiber compositions. At this concentration, the nonfibrillated fiber has little or no effectiveness as a stop leak, whereas the compositions of the invention, as demonstrated by the lower fluid loss, show effectiveness as a stopleak.

EXAMPLE III

Comparative tests were run with compositions containing fibrillated fiber and nonfibrillated fiber. The fibrillated fiber and nonfibrillated fiber were the same used in Examples I and II above. The composition according to the invention was made as in Example I except the glycol/water/clay dispersion comprised essentially of 80 wt.% ethylene glycol, 15 wt.% water, and 5 wt.% Volclay KWK. The fibrillated fiber was dispersed in the glycol/water/clay dispersion as in Example I to give a predispersion with 1.5 weight percent fibrillated fiber, based on the total weight. The predispersion was mixed with an antifreeze composition, consisting essentially of ethylene glycol with corrosion inhibiting additives, to give an antifreeze/fibrillated fiber final dispersion with about 0.05 wt.% fibrillated fiber. Compositions using nonfibrillated fiber were made in the same manner except the nonfibrillated fiber was substituted for the fibrillated fiber. The compositions were tested as described in Example I, except 450 ml of the antifreeze and 450 ml of water were added to the test unit. The fluid loss was measured during the unpressurized time period (unpressurized loss), and the pressurized time period (pressurized loss). After the pressurized time period, the seal was opened by inserting a wire or flat piece of metal into the leak. After opening the leak the apparatus was run for one minute and the fluid loss since the opening (reseal loss) was measured. The tests were run using three sizes of crevice leaks and a pinhole leak. The results are summarized in Tables C and D below. The asterisk(*) denotes a loss greater than 500 ml and indicates that no seal was formed in the leak. The values shown in Tables C and D are the average values of three tests.

TABLE C

| Antifreeze Compositions with Fiber, Crevice Leaks | | | |
|---|---|---|---|
| | Width Crevice Leak | | |
| | 0.005 | 0.008 | 0.010 |
| 0.05 Wt. % Fibrillated Fiber | | | |
| Unpressurized Loss (ml) | 4 | 10 | 7 |
| Pressurized Loss (ml) | 27 | 183 | * |
| Reseal Loss (ml) | 57 | 212 | — |
| TOTAL (ml) | 88 | 405 | * |
| 0.05 wt. % Nonfibrillated Fiber | | | |
| Unpressurized Loss (ml) | 10 | 62 | 203 |
| Pressurized Loss (ml) | 144 | * | * |

TABLE C-continued

| Antifreeze Compositions with Fiber, Crevice Leaks | | | |
|---|---|---|---|
| | Width Crevice Leak | | |
| | 0.005 | 0.008 | 0.010 |
| Reseal Loss (ml) | 120 | — | — |
| TOTAL | 274 | * | * |

TABLE D

| Antifreeze Compositions with Fiber, Pinhole Leak (0.0135 in) | |
|---|---|
| 0.05 wt. % Fibrillated Fiber | |
| Unpressurized Loss (ml) | 2 |
| Pressurized Loss (ml) | 4 |
| Reseal Loss (ml) | 1 |
| TOTAL (ml) | 7 |
| 0.05 wt. % Nonfibrillated Fiber | |
| Unpressurized Loss (ml) | 4 |
| Pressurized Loss (ml) | 9 |
| Reseal Loss (ml) | 130 |
| TOTAL (ml) | 143 |

As shown by the data in the above Tables C and D, the composition of the invention containing the fibrillated fiber shows significant improvement in the stopping of leaks over a composition containing a nonfibrillated fiber, asbestos. This is particularly the case in the sealing of pin-hole leaks, as shown in Table D, wherein the difference is more than an order of magnitude. This example shows that the composition of the invention is most effective in the sealing of pinhole leaks, and shows the surprising and unexpected improvement of the compositions of the invention containing fibrillated fiber over prior art compositions containing nonfibrillated fiber.

Although particular embodiments of the invention have been described in detail, it will be recognized that modifications of these embodiments are contemplated and within the scope of the invention.

What is claimed is:

1. A composition for the stopping of leaks in a coolant system which comprises a suspension in a liquid medium of a fibrillated fiber in an amount which is effective for the stopping of leaks.

2. A composition for the stopping of leaks in a coolant system which comprises a suspension in a liquid medium of at least about 0.015 wt.% fibrillated fiber, based on the total weight.

3. A composition for the stopping of leaks in a coolant system which comprises a suspension in a liquid medium of at least about 0.03 wt.% fibrillated fiber, based on the total weight.

4. The composition of claim 1 wherein the fibrillated fiber comprises a polymer consisting essentially of the recurring units selected from the group;

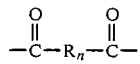 (I)

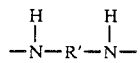 (II)

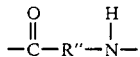 (III)

with the proviso that

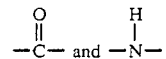

are present in the polymer in substantially equimolar amounts, and wherein R, R', and R'', which may the same or different, are divalent radicals, n may be zero or the integer one, and wherein the R, R', and R'' radicals in the polymer are saturated or unsaturated aliphatic or ringed aliphatic radicals containing 1 to 10 carbon atoms, or single ringed or fused multiringed carbocyclic, heterocyclic aromatic radicals, or a series of such radicals.

5. The composition of claim 4 wherein the R, R', and R'' in the polymer are single rigid radicals with extended bonds or a series of such rigid radicals which are linked together directly by extended bonds.

6. The composition of claim 5 wherein R, and R' are selected from the group 1,4-phenylene, 4,4'-biphenylene, 2,6-naphthylene, 2,5-pyridene, trans-vinylene and trans-1,4-cyclohexylene and R'' is 1,4-phenylene with the proviso that at least 50 mole percent of either R or R' radicals are 1,4-phenylene.

7. The composition of claim 1 wherein the fibrillated fiber comprises poly(imino-1,4-phenyleneiminoterephthaloyl).

8. The composition of claim 1 wherein the liquid medium comprises ethylene glycol.

9. The composition of claim 8 wherein the liquid medium additionally contains a corrosion inhibitor in an inhibitory amount.

10. The composition of claim 8 wherein the liquid medium additionally comprises water.

11. A composition for the stopping of leaks in a coolant system which comprises a suspension in a liquid medium of a fibrillated fiber as the sole leak-stopping additive in an amount which is effective for the stopping of leaks.

12. A composition for the stopping of leaks in a coolant system which comprises a suspension in a liquid medium of at least about 0.015 wt.% fibrillated fiber, based on the total weight, as the sole leak-stopping additive.

13. The composition of claim 12 wherein the suspension in the liquid medium is of at least about 0.03 wt.% fibrillated fiber.

14. A method for the stopping of leaks in a coolant system which comprises providing as the liquid coolant in the coolant system a suspension in a liquid medium of a fibrillated fiber in an amount which is effective for the stopping of leaks.

15. A method for the stopping of leaks in a coolant system which comprises providing as the liquid coolant in the coolant system a suspension in a liquid medium of at least about 0.015 wt.% fibrillated fiber.

16. The method of claim 15 wherein the suspension in the liquid medium is of at least about 0.03 wt.% fibrillated fiber.

17. The method of claim 15 wherein the fibrillated fiber comprises a polymer consisting essentially of the recurring units selected from the group;

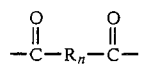 (I)

-continued

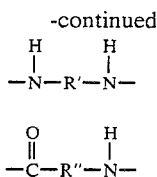

with the proviso that

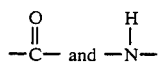

are present in the polymer in substantially equimolar amounts, and wherein R, R', and R", which may the same or different, are divalent radicals, n may be zero or the integer one, and wherein the R, R', and R" radicals in the polymer are saturated or unsaturated aliphatic or ringed aliphatic radicals containing 1 to 10 carbon atoms, or single ringed or fused multiringed carbocyclic, heterocyclic aromatic radicals, or a series of such radicals.

18. The method of claim 17 wherein the R, R', and R" in the polymer are single rigid radicals with extended bonds or a series of such rigid radicals which are linked together directly by extended bonds.

19. The method of claim 18 wherein R, and R' are selected from the group 1,4-phenylene, 4,4'-biphenylene, 2,6-naphthylene, 2,5-pyridene, trans-vinylene and trans-1,4-cyclohexylene and R" is 1,4-phenylene with the proviso that at least 50 mole percent of either R or R' radicals are 1,4-phenylene.

20. The method of claim 19 wherein the fibrillated fiber comprises poly(imino-1,4-phenyleneiminoterephthaloyl).

21. The method of claim 14 wherein the liquid medium comprises ethylene glycol.

22. The method of claim 21 wherein the liquid medium additionally contains a corrosion inhibitor in an inhibitory amount.

23. The method of claim 21 wherein the liquid medium additionally comprises water.

24. The method of claim 15 wherein the fibrillated fiber is the sole leak stopping additive.

25. The composition of claim 1 wherein the fibrillated fiber has a length not less than about 1 mm.

26. The composition of claim 1 wherein the fibrillated fiber has a length between about 1 mm and about 7 mm.

27. The composition of claim 1 wherein the fibrillated fiber has a surface area greater than about 1 square meter per gram.

28. The composition of claim 1 wherein the fibrillated fiber has a surface area greater than about 10 square meters per gram.

29. The method of claim 15 wherein the fibrillated fiber has a length not less than about 1 mm.

30. The method of claim 15 wherein the fibrillated fiber has a length between about 1 mm and about 7 mm.

31. The method of claim 15 wherein the fibrillated fiber has a surface area greater than about 1 square meter per gram.

32. The method of claim 15 wherein the fibrillated fiber has a surface area greater than about 10 square meters per gram.

33. The composition of claim 23 wherein the total water content is less than about 3.5 wt. %, based on the total weight.

34. The composition of claim 23 wherein the total water content is about 3 wt. %, based on the total weight.

35. The composition of claim 1 additionally comprising a dispersant.

36. The composition of claim 35, wherein the dispersant is an alumino-silicate clay suspending agent.

37. The method of claim 14 wherein the liquid coolant additionally comprises a dispersant.

38. The method of claim 37, wherein the dispersant is an alumino-silicate clay suspending agent.

* * * * *